(12) United States Patent
Manville et al.

(10) Patent No.: US 12,406,039 B2
(45) Date of Patent: Sep. 2, 2025

(54) MULTI-CLUSTER ACCESS

(71) Applicant: Kasten, Inc., Columbus, OH (US)

(72) Inventors: Thomas Manville, Mountain View, CA (US); Vaibhav Kamra, Sunnyvale, CA (US); Deepika Dixit, San Jose, CA (US); Onkar Bhat, San Jose, CA (US); Alex Vorbau, Los Altos, CA (US)

(73) Assignee: Kasten, Inc., Columbus, OH (US)

( * ) Notice: Subject to any disclaimer, the term of this patent is extended or adjusted under 35 U.S.C. 154(b) by 853 days.

(21) Appl. No.: 17/497,242

(22) Filed: Oct. 8, 2021

(65) Prior Publication Data

US 2023/0113510 A1   Apr. 13, 2023

(51) Int. Cl.
  *G06F 21/00* (2013.01)
  *G06F 21/31* (2013.01)
  *G06F 21/60* (2013.01)

(52) U.S. Cl.
  CPC ............ *G06F 21/31* (2013.01); *G06F 21/604* (2013.01); *G06F 21/606* (2013.01); *G06F 2221/2141* (2013.01); *G06F 2221/2145* (2013.01)

(58) Field of Classification Search
  None
  See application file for complete search history.

(56) References Cited

U.S. PATENT DOCUMENTS

| | | | | |
|---|---|---|---|---|
| 8,621,569 | B1 * | 12/2013 | Ewing | G06F 12/084 |
| | | | | 713/157 |
| 10,970,410 | B2 * | 4/2021 | Barnes | G06F 21/6218 |
| 11,146,379 | B1 * | 10/2021 | Ackley-Smith | H04L 9/0825 |
| 2002/0174169 | A1 * | 11/2002 | Schmid | G06F 9/548 |
| | | | | 709/201 |
| 2018/0131683 | A1 * | 5/2018 | Woodward | H04W 12/04 |
| 2020/0092259 | A1 * | 3/2020 | Bjäre | H04L 63/0272 |
| 2021/0311758 | A1 | 10/2021 | Cao et al. | |
| 2021/0314310 | A1 | 10/2021 | Cao et al. | |

OTHER PUBLICATIONS

International Search Report and Written Opinion directed to related International Application No. PCT/US2021/054164, mailed Jun. 30, 2022, 12 pages.

(Continued)

*Primary Examiner* — Ghazal B Shehni
(74) *Attorney, Agent, or Firm* — Sterne, Kessler, Goldstein & Fox P.L.L.C.

(57) ABSTRACT

Disclosed herein are system, method, and computer program product embodiments for multi-cluster access. In some embodiments, the server receives a first request to bind one or more cluster roles associated with a user to each of one or more secondary computing clusters. The server binds the user's credentials with the one or more cluster roles corresponding to each of one or more secondary computing clusters. Furthermore, the server receives a second request for providing the user access to the primary computing cluster. Moreover, the server receives a third request from the user interface intended for at least one secondary computing cluster. The server forwards the third request to the at least one secondary computing cluster while impersonating at least one cluster role of the one or more cluster roles corresponding to the at least one secondary computing cluster.

20 Claims, 9 Drawing Sheets

(56) References Cited

OTHER PUBLICATIONS

Anonymous, "K10 Multi-Cluster Manager—Multi-Cluster User Access—K10 4.0.2 documentation," May 16, 2021, pp. 1-3, Retrieved from Internet: URL:https://web.archive.org/web/20210516070018/https://docs.kasten.io/latest/multicluster/user_access.html on Jun. 14, 2022.

Burns et al., "Kubernetes up & Running," Oct. 4, 2019, O'Reilly Media Inc., 277 pages, Retrieved from the Internet: URL:https://www.vmware.com/content/dam/digitalmarketing/vmware/en/pdf/docs/vmware-kubernetes-up-running-dive-into-the-future-of-infrastructure.pdf, on May 13, 2022.

\* cited by examiner

FIG. 6

MULTI-CLUSTER ACCESS

BACKGROUND

Entities have increasingly started adopting cloud-native architectures and platforms to support their critical applications. These cloud-native architectures and platforms may be implemented across multiple computing clusters, such as multi-cluster and multi-tenant environments. Each computing cluster may execute one or more applications and store data corresponding to the one or more applications.

Each of the computing clusters may be independent of one other. Therefore, providing user access to the computing clusters may be a difficult and error-prone process. For example, each of the computing clusters may require different user credentials. This may require manually creating user accounts and manually setting up user permissions for the user accounts. Furthermore, a given user may need to access different interfaces that correspond to a respective computing cluster. This creates an inefficient decentralized environment.

In light of the above, conventional cluster management systems fail to provide effective and efficient user access to multi-cluster and multi-tenant environments.

BRIEF DESCRIPTION OF TRE DRAWINGS

The accompanying drawings are incorporated herein and form a part of the specification.

FIG. 6 illustrates an example user interface for the system of multi-cluster management, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
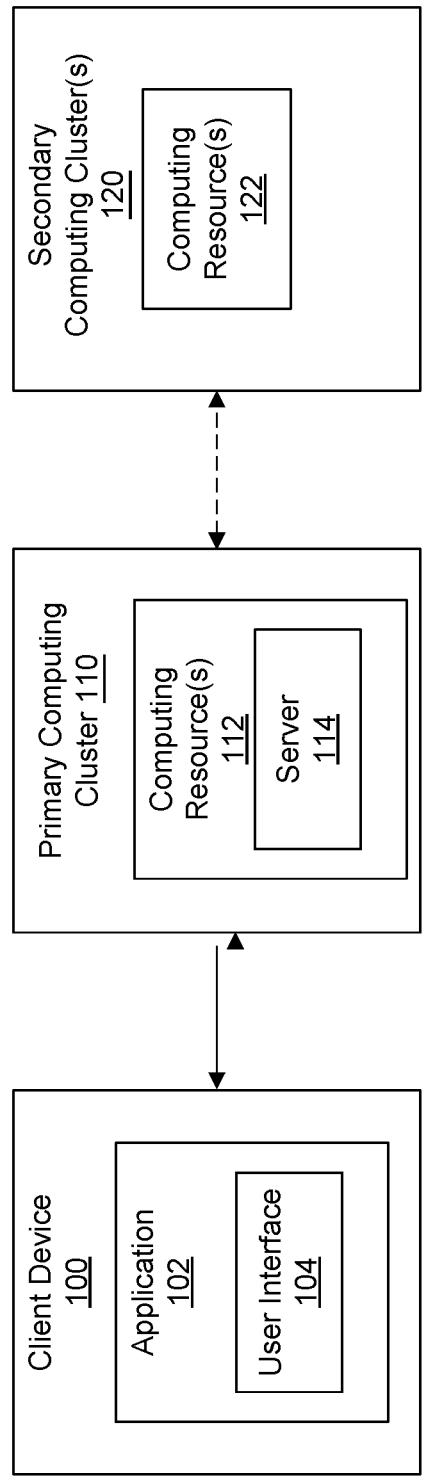
FIG. 1 is a block diagram of an architecture for multi-cluster management, according to some embodiments.

Provided herein are system, apparatus, device, method and/or computer program product embodiments, and/or combinations and sub-combinations thereof, for multi-cluster management. Multi-cluster management may include bootstrapping a primary computing cluster to secondary computing clusters and accessing secondary computing clusters via the primary computing cluster.

Multi-cluster and multi-tenant environments may include multiple computing clusters. Users may need to access one or more of the multiple computing clusters. However, conventional cluster management systems provide inefficient and ineffective methods for users to access the different clusters. Specifically, conventional cluster management systems may require manually creating different user accounts for each respective computing cluster. Furthermore, the user may need to use a different interface to access each specific computing cluster.

Embodiments herein solve the above technical issues and challenges posed by conventional cluster management systems in two ways. First, embodiments herein boot-strap a primary computing cluster to different computing clusters in a multiple-cluster and multi-tenant environment. Second, embodiments herein bind user roles to the different computing clusters in the multi-cluster and multi-tenant environment and allow the users to submit requests to the different clusters via the primary cluster. This provides a centralized environment in which users may access the different computing clusters via the primary computing cluster.

In some embodiments, a server residing on a primary computing cluster receives a first request to establish a temporary connection between the primary computing cluster and a secondary computing cluster. The first request includes a first set of credentials. The server establishes the temporary connection between the primary computing cluster and the secondary computing cluster using the first set of credentials. Furthermore, the server receives a second request to establish a persistent connection between the primary computing cluster and the secondary computing cluster. The request includes configuration settings for establishing the persistent connection. The server establishes the persistent connection by transmitting a third request comprising the configuration settings to the secondary computing cluster thereby causing the secondary computing cluster to generate a second set of credentials corresponding to the primary computing cluster and storing the second set of credentials in a data storage device in the primary computing cluster.

In some other embodiments, the server receives a first request to bind one or more cluster roles associated with a user to each of one or more secondary computing clusters. The first request comprises the user's credentials. The server binds the user's credentials with the one or more cluster roles corresponding to each of one or more secondary computing clusters. Furthermore, the server receives a second request for providing the user access to the primary computing cluster. The second request comprises the user's credentials. The server causes display of a user interface in response to authenticating the user's credentials. Moreover, the server receives a third request from the user interface intended for at least one secondary computing cluster of the one or more secondary computing clusters. The server identifies the one or more cluster roles corresponding to the at least one secondary computing cluster based on the user's credentials, and forwards the third request to the at least one secondary computing cluster while impersonating at least one cluster role of the one or more cluster roles corresponding to the at least one secondary computing cluster.

The described embodiments provide for establishing a persistent connection between a primary computing cluster and one or more secondary computing clusters. As a result, a user may transmit requests to the one or more secondary computing clusters via the primary computing cluster. To this end, embodiments herein solve the technical issues and challenges posed by conventional cluster management systems by providing a centralized interface for the user to access one or more secondary computing clusters boot-strapped to the primary computing cluster using the user's credentials for the primary computing cluster.

FIG. 1 is a block diagram of an architecture for multi-cluster management, according to some embodiments. In some embodiments, the architecture may include a client device 100, primary computing cluster 110, and secondary computing cluster(s) 120. Client device 100, primary computing cluster 110, and secondary computing cluster 120 may be connected through wired connections, wireless connections, or a combination of wired and wireless connections.

As an example, client device 100, primary computing cluster 110, and secondary computing cluster 120 can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Client device 100 may include application 102 and user interface 104. Application 102 may generate user interface 104. Application 102 may communicate with primary computing cluster 110. A user may interact with user interface 104 to interface with primary computing cluster 110.

Primary computing cluster 110 and secondary computing cluster 120 may reside in a cloud computing environment and can be managed by a cloud orchestration system. As a non-limiting example, the cloud orchestration system may be KUBERNETES (developed by Cloud Native Computing Foundation). Primary computing cluster 110 may include computing resources 112. Computing resources 112 may include one or more servers, routers, computing devices, data volumes, workstations, etc. Furthermore, computing resources 112 may include server 114.

Secondary computing cluster 120 may include computing resources 122. Computing resources 122 may include one or more servers, routers, computing devices, data volumes, workstations, etc. Secondary computing cluster 120 may include one or more namespaces. Namespaces are sub-clusters within secondary computing cluster 120. One or more applications may be executed in each namespace.

Users may interact with secondary computing cluster 120 to deploy applications, initiate backups and restores, debug applications, develop applications, etc. For example, secondary cluster 120 may be dedicated to performing one or more tasks such as developing and testing applications. In this regard, secondary computing cluster 120 may allow users to develop and test applications. A different secondary computing cluster 120 may be responsible for the production of an application. That is, the application may be deployed on the different secondary computing cluster. The different secondary computing cluster 120 may allow users to view metrics related to the deployment of the application and debug the deployed application.

Primary computing cluster 110 may be persistently connected (e.g., boot-strapped) to secondary computing cluster 120. As a result, client device 100 may communicate with secondary computing cluster 120 by interfacing with primary computing cluster 110 via application 102. Application 102 may be a web-based application downloaded on client device 106. Alternatively, application 102 may be accessed via an internet browser.

Figure 2:
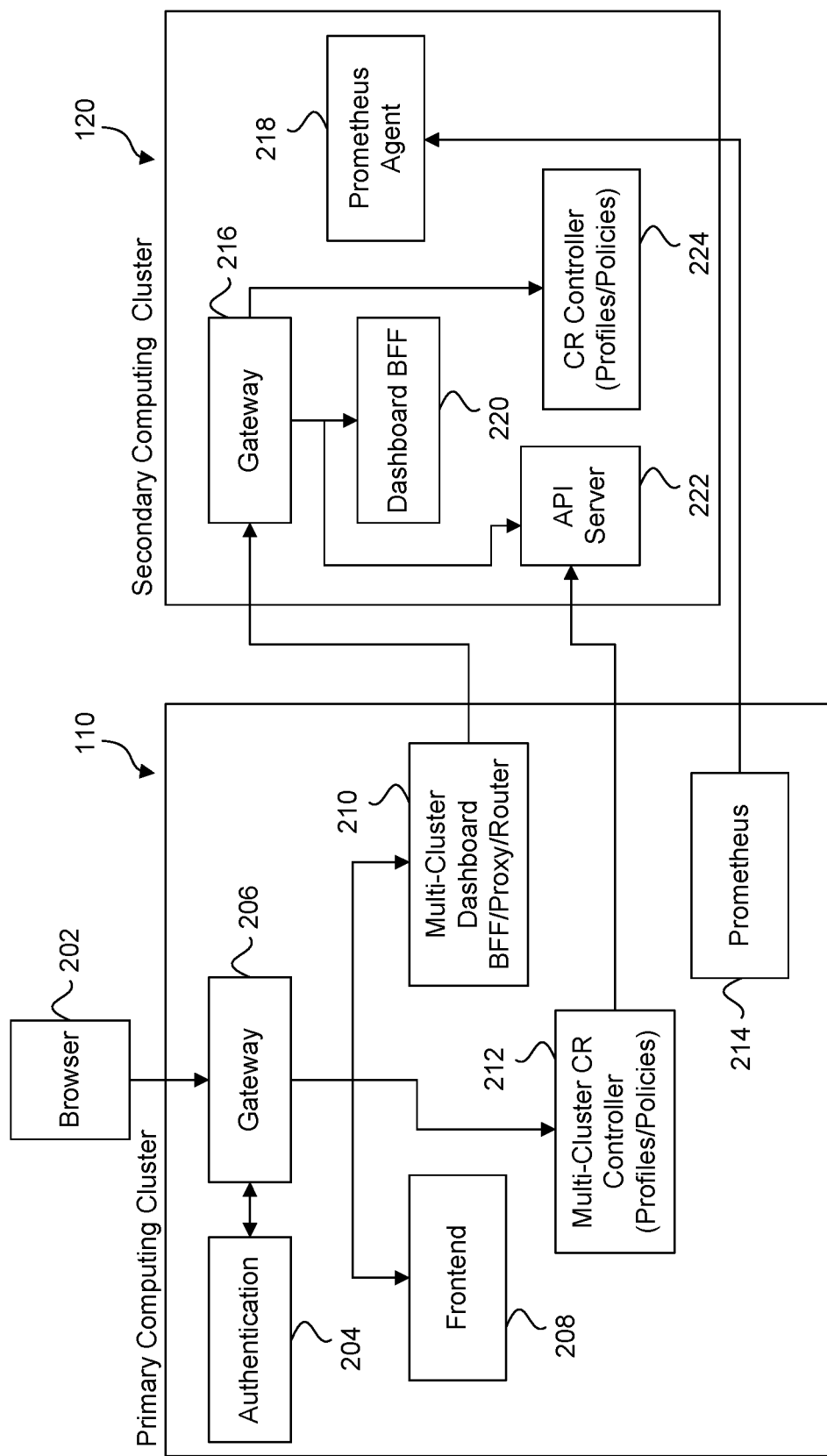
FIG. 2 is a block diagram illustrating components of the primary and secondary computing cluster, according to some embodiments.

FIG. 2 is a block diagram illustrating components of primary computing cluster 110 and secondary computing cluster 120, according to some embodiments. FIG. 2 is described with reference to FIG. 1. However, FIG. 2 is not limited to that example embodiment.

In some embodiments, primary computing cluster 110 may include authentication engine 204, gateway 206, frontend 208, Backend For Frontend (BFF)/Proxy Router 210, controller 212, and instrumentation framework 214. Authentication engine 204, gateway 206, frontend 208, BFF/Proxy Router 210, controller 212, and instrumentation framework 214 may be executed by computer resources 112 (e.g., server 114). Secondary computing cluster 120 may include gateway 216, instrumentation framework agent 218, dashboard BFF 220, Application Program Interface (API) 222, and controller 224. Gateway 216, instrumentation framework (IF) agent 218, dashboard BFF 220, API 222, and controller 224 may be executed by computer resources 122.

Authentication engine 204 may be configured to authenticate a user attempting to access primary computing cluster 110. For example, authentication engine 204 may use a user's username and password to authenticate the user. Gateway 206 may be configured to route traffic received by primary computing cluster 110 to components within primary computing cluster 110. For example, gateway 206 may route traffic to frontend 208, BFF/Proxy Router 210, and controller 212.

Frontend 208 may be a micro-service configured to provide a user interface for a user accessing primary computing cluster 110. BFF/Proxy Router 210 may be a proxy, BFF, or router. BFF/Proxy Router 210 may be configured to route or forward requests to secondary computing cluster 120. To this end, BFF/Proxy/Router 210 may act as a proxy, shim, or router between primary computing cluster 110 and secondary computing cluster 120. Controller 212 may be a control loop of primary computing cluster 110 that monitors the state of primary computing cluster 110. Controller 212 may store the user profiles and policies. The user profiles and policies may be resources of primary computing cluster 110 and secondary computing cluster 120 which a given user may access.

Instrumentation framework 214 may be configured to collect usage data from secondary computing cluster 120. Instrumentation framework 214 may use the usage data of secondary computing cluster 120 and generate data analytics of the usage of secondary computing cluster 120.

Gateway 216 may be configured to route traffic received by secondary computing cluster 120 to components within secondary computing cluster 120. Gateway 216 may route traffic to dashboard BFF 220, API server 222, and controller 224.

Dashboard BFF 220 may be a shim that is configured to receive requests from gateway 216. Dashboard BFF 220 may be configured to format the received requests and forward the request to the appropriate computer resource of secondary computing cluster 120. API server 222 may be configured to receive requests from gateway 216. API server 222 may format the received requests and forward the request to the appropriate computer resource of secondary computing cluster 120. Controller 224 may be a control loop of secondary computing cluster 120 that monitors the state of secondary computing cluster 120. Controller 224 may manage the user profiles and policies.

Instrumentation framework agent 218 may interface with instrumentation framework 214 to provide usage data for secondary computing cluster 120. For example, instrumentation framework agent 218 may collect usage data of virtual machines, servers, databases residing on secondary computing cluster 120. Instrumentation framework 214 may use the usage data to analyze the performance of secondary computing cluster 120.

In some embodiments, an administrator (or admin) user may access primary computing cluster 110 to establish a persistent connection with secondary computing cluster 120 using browser 202. An admin user may be a system administrator that has access to one or more of the computing clusters (e.g., primary computing cluster 110 and secondary computing cluster 12) in the multi-cluster environment. The admin user's credentials may correspond with an admin user's credentials.

The admin user may use client device 100 to transmit a request to access primary computing cluster 110 from browser 202. Browser 202 may be an internet browser executing on client device 100. It can be appreciated that the admin user may also access primary computing cluster 110 using application 102. Gateway 206 may receive the request to access primary computing cluster 110 from browser 202. The request may include the admin user's credentials. Gateway 206 may forward the admin user's credentials to authentication engine 204. Authentication engine 204 may use the admin user's credentials to authenticate the admin user and transmit a response back to gateway 206. The response may be a verification or failure of authentication of the admin user.

In response to successfully authenticating the admin user, gateway 206 may transmit a request to frontend 208. Frontend 208 may generate a user interface (e.g., user interface 104) to be rendered on browser 202. The user interface may allow for initiating a temporary connection. For example, gateway 206 may transmit a request to controller 212 to establish a temporary connection between primary computing cluster 110 and secondary computing cluster 120 using the admin user's credentials. Controller 212 may transmit the request to API server 222. The request may include the admin user's credentials. API server 222 may format the request and forward the formatted request to an appropriate computing resource on secondary computing cluster 120. The appropriate computing resource may verify the admin user's credentials and establish a temporary connection between primary computing cluster 110 and secondary computing cluster 120. The user interface may render a status or progress while the temporary connection is established and the configuration process is executed.

In response to establishing the temporary connection, gateway 206 may transmit a request to frontend 208. Frontend 208 may generate a user interface (e.g., user interface 104) to be rendered on browser 202. The user interface may allow the admin user to interface with secondary computing cluster 120. For example, the user interface may allow the admin user to transmit requests to secondary computing cluster 120.

The user interface may receive one or more inputs corresponding to a request to establish a persistent connection with secondary computing cluster 120. The one or more inputs may include configuration settings for establishing the persistent connection. The one or more inputs may also include an identifier of the secondary computing cluster. Establishing the persistent connection may involve generating credentials for primary computing cluster 110.

The admin user may submit the request to establish a persistent connection between primary computing cluster 110 and secondary computing cluster 120 using the user interface. Gateway 206 may receive the request and may forward the request to controller 212.

Controller 212 may format the request into specific commands for generating credentials for primary computing cluster 110. The commands may include security certificates, Internet Protocol (IP) addresses of computing resources in the secondary computing cluster 120, and the configuration settings for generating credentials for primary computing cluster 110. The commands may also include the admin user's credentials. As a non-limiting example, the commands may include the following information:

primary-name: User-defined name for primary, must be unique primary-kubeconfig: Path to a config file to use for primary computing cluster 110. The config file contains the configuration settings for generating the credentials for primary computing cluster 110 primary-context: Name of context in the config file for primary computing cluster 110. A context may be access parameters for primary computing cluster 110.

primary-k10-releaseName: Name of the cloud orchestration system release installed in primary computing cluster 119. This may be a version of the cloud orchestration system.

primary-k10-namespace: Name of the namespaces in primary computing cluster 110.

secondary-name: User-defined name for secondary computing cluster 120. This may be an identifier of secondary computing cluster 120. This may be a unique identifier.

secondary-kubeconfig: Path to the config file to use for secondary computing cluster 120. This may include configuration settings of secondary computing cluster 120.

secondary-context: Name of context in the config file for secondary computing cluster 120. A context may be access parameters for secondary computing cluster 120.

secondary-k10-releaseName: Name of the cloud orchestration system release installed in secondary cluster. This can be the version of the cloud orchestration system executing on secondary computing cluster 120.

secondary-k10-namespace: Name of the namespaces in secondary computing cluster 120.

secondary-ingress: External ingress for secondary computing cluster 120. The external ingress may be an API object that manages external access to the services in a cluster, such as HTTP.

Controller 212 may transmit the commands to API server 222 using the temporary connection established between primary computing cluster 110 and secondary computing cluster 120. In some embodiments, the admin user may transmit the formatted commands to generate credentials using a command-line interface (CLI) to primary computing cluster 110. Controller 212 may transmit the commands to API server 222.

API server 222 may format the commands and forward the commands to the appropriate computing resource in second computing cluster 120 to generate the credentials for primary computing cluster 110. The appropriate computing resource may include a service account controller, service account admission controller, and token controller. The appropriate computing resource may package the security certificates, IP addresses of computing resources in the secondary computing cluster 120, and the configuration settings to generate credentials for primary computing cluster 110 to access secondary computing cluster 120. The appropriate computing resource may transmit the credentials to primary computing cluster 110. Controller 212 may store the credentials of primary computing cluster 110 for accessing secondary computing cluster 110. The credentials may include a multi-cluster service account token (MCSA). The MCSA token may be used to access secondary computing cluster 120. Once controller 212 stores the credentials of primary computing cluster 110, a persistent connection between primary computing cluster 110 and secondary computing cluster 120 may be established.

Once a persistent connection between primary computing cluster 110 and secondary computing cluster 120 is established, a non-admin user may attempt to access secondary computing cluster 120 via primary computing cluster 110. For example, a non-admin user may submit a request to access primary computing cluster 110 via browser 202. The request may include the non-admin user's credentials to access primary computing cluster 110.

Gateway 206 may receive the request and may forward the non-admin user's credentials to authentication engine 204. Authentication engine 204 may authenticate the non-admin user using the non-admin user's credentials and transmit a response to gateway 206. The response may include verification or failure of authenticating the non-admin user.

In response to authenticating the non-admin user, gateway 206 may forward the request to BFF/Proxy Router 210. BFF/Proxy Router 210 may verify the non-admin user's permission settings for accessing second computing cluster 120.

In response to verifying the non-admin user's permission settings with respect to secondary computing cluster 120, BFF/Proxy Router 210 may transmit a request to frontend 208. Frontend 208 may generate a user interface (e.g., user interface 104) to be rendered on browser 202. The user interface may include inputs, selections, and other options for interfacing with secondary computing cluster 120. The inputs, selections, and other options may be limited based on the non-admin user's permission settings. The non-admin user may provide their inputs on the user interface and submit a request to be transmitted to secondary computing cluster 120.

Gateway 206 may receive the request from the user interface. Gateway 206 forward the request to BFF/Proxy Router 210. BFF/Proxy Router 210 may retrieve primary computing cluster 110's credentials for accessing secondary computing cluster 120, including, but not limited to, the MCSA token from controller 212. BFF/Proxy/Router 210 may format the request and primary computing cluster 110's credentials. BFF/Proxy/Router 210 may access secondary computing cluster 120 using primary computing cluster 110's credentials while impersonating the non-admin user. In response to accessing secondary computing cluster 120, BFF/Proxy/Router 210 may transmit the request to gateway 216. Accessing secondary computing cluster 120 and impersonating users will be described in greater detail with respect to FIGS. 4, 5, and 8.

Gateway 216 may receive the request from BFF/Proxy/Router 210. Gateway 216 may confirm that the non-admin user has permission to transmit the request using controller 224. Controller 224 may verify that the non-admin user has permission to transmit the request based on cluster role bindings associated with the non-admin user. In response to verifying that the non-admin user has permission to transmit the request, gateway 216 may forward the request to dashboard BFF 220 or API server 222. Dashboard BFF 220 or API server 222 may format the request and forward the request to a computing resource responsible for processing the request.

In this way, the non-admin user can interface with second computing cluster 120 without using specific credentials corresponding to second computing cluster 120. As a result, the non-admin user may interface with secondary computing cluster 120 and other computing clusters to which primary computing cluster 110 is boot-strapped.

Figure 3:
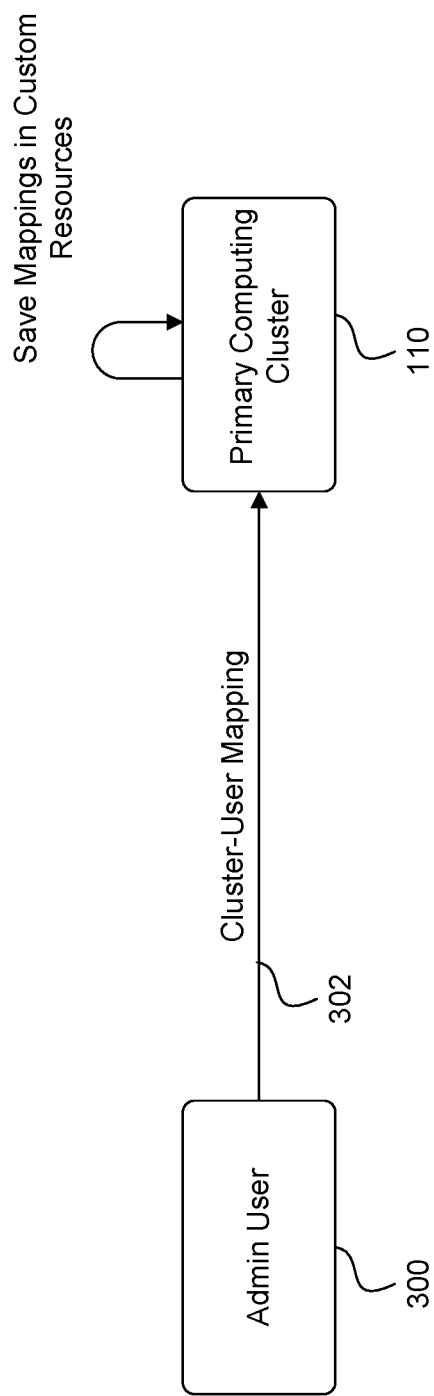
FIG. 3 is a block diagram illustrating the data flow of binding cluster roles to secondary computing clusters, according to some embodiments.

FIG. 3 is a block diagram illustrating the data flow of binding cluster roles associated with users to secondary computing clusters, according to some embodiments. FIG. 3 shall be described with reference to FIGS. 1 and 2. However, FIG. 3 is not limited to those example embodiments.

In some embodiments, primary computing cluster 110 may be boot-strapped to one or more secondary computing clusters 120, as described with respect to FIG. 2. An admin user 300 may use client device 100 to access primary computing cluster 110. Primary computing cluster 110 may authenticate admin user 300 using the admin user's credentials, as described above with respect to FIG. 2. Once authenticated, user interface 104 may be displayed on client device 100. Admin user 300 may interact with user interface 104 to transmit request 302 from user interface 104 to define a mapping of users and cluster roles with secondary computing clusters 120. The cluster roles may correspond to a given user's permissions and policies with respect to a respective secondary computing cluster 120. The cluster roles may be predefined for each respective secondary computing cluster 120. For example, the type of cluster roles may include administrator (also referred to as admin), backup-admin, basic, or temporary (read-only) configuration. Each type of cluster role may provide different types of user permissions with respect to the respective secondary computing cluster 120. The type of cluster role for a given user may be different for different secondary computing clusters 120.

In some embodiments, a given user may have multiple cluster roles for a respective secondary computing cluster 120. For example, the given user may have a first binding to a cluster role that provides basic user permissions to a set of clusters, while also having a second binding to a separate cluster role that provides admin user permissions to a separate (although possibly overlapping) set of clusters. The possible overlap may include the respective secondary computing cluster 120. In this scenario, the given user's permissions with respect to secondary computing cluster 120 may be a union of the basic user permissions and the admin user permissions.

The permission for each of the cluster roles may be defined in secondary computing clusters 120. For example, the admin cluster role may be defined when a secondary computing cluster 120 is deployed. The users with the admin cluster role may have unrestricted access to all operations and configurations of a respective secondary computing cluster 120. The operations available to users with the admin cluster role may include but are not limited to, creating policies to protect any application in the cluster, creating location profiles that represent a backup target, and listing actions created by all types of users in a namespace.

When a secondary computing cluster 120 is deployed, the basic cluster role is defined. The users with the basic role may have limited access to the applications and configurations of secondary computing cluster 120. The operations that users with the basic role may execute may include, but are not limited to, listed applications in namespaces where the basic user has access, backup, and restore applications in namespaces the basic user can access.

When a secondary computing cluster 120 is deployed, the temporary configuration cluster role is defined. The users in the temporary configuration role may view the configurations of secondary computing cluster 120. The users in the temporary configuration role may not be able to modify the configurations or perform operations on the applications, such as, but not limited to, backup or restore.

Request 302 may include an identifier for each user. The identifier may be name, id number, username, etc. Request 302 may also include a cluster role for each user for each respective secondary computing cluster 120. Furthermore, request 302 may include the applications or namespaces of secondary computing cluster 120 that a given user may access. For example, request 302 may identify a cluster role as a basic cluster role for a given user. In this scenario, request 302 may also identify applications or namespaces of secondary computing cluster 120 that the given user may access. A respective secondary computing cluster 120 may include multiple namespaces. Namespaces may be logically separated sub-clusters. Each namespace may include one or more applications.

Primary computing cluster 110 may receive request 302. Controller 212 may bind users with the cluster roles as defined in request 302. Binding the users to the cluster roles may include creating cluster role binding objects. As a non-limiting example, a cluster role binding object may be an API object, such as a Kubernetes object (ClusterRoleBinding). Furthermore, binding the users to the cluster roles may involve generating a mapping of each user to cluster role for each respective secondary computing cluster 120. Controller 212 may execute operation 304 to bind the users to the cluster roles.

The cluster role binding object may define a user and cluster role for each respective secondary computing cluster 120. For example, a cluster role binding object for an admin and backup-admin cluster role may include the user identifier, secondary computing cluster 120's API Group, cluster role, and secondary computing cluster 120's namespace or identifier. A cluster role binding object for a basic cluster role may include the user identifier, secondary computing cluster 120's API Group, cluster role, and secondary computing cluster 120's namespaces which the user can access. A cluster role binding object for a temporary configuration cluster role may include the user identifier, secondary computing cluster 120's API Group, cluster role, and secondary computing cluster 120's namespace or identifier.

In some embodiments, the cluster role binding objects may indicate multiple cluster role bindings for a single user. That is, a cluster role binding object may include a cluster role for each respective secondary computing cluster 120 for the single user.

As a non-limiting example, secondary computing clusters 120 may include clusters A, B, C, and D. Request 302 may indicate that user 1 corresponds to an admin cluster role for each secondary computing clusters 120 (e.g., clusters A-D). Controller 212 may generate the following cluster role binding object for user 1:
    apiVersion: auth.kio.kasten.io/v1alpha1
        kind: K10ClusterRoleBinding
    metadata:
        name: mc_admin_binding_user1
    spec:
        k10ClusterRole:
        name: admin_role
    clusters:
        selector: all
    subjects:
        User 1

The above cluster role binding object may indicate that User 1 is bound to the administrator cluster role for all secondary computing clusters 120.

Furthermore, request 302 may further indicate that user 2 corresponds to an admin cluster role for clusters A and B. Controller 212 may generate the following cluster role binding object for user 2:
    apiVersion: auth.kio.kasten.io/v1alpha1
        kind: K10ClusterRoleBinding
    metadata:
        name: mc_admin_binding_user2
    spec:
        k10ClusterRole:
        name: admin_role
    clusters:
        Cluster A
        Cluster B
    subjects:
        User 2

The above cluster role binding object may indicate that User 2 is bound to the administrator cluster role for clusters A and B of secondary computing clusters 120. This may also indicate that User 2 is forbidden from clusters C and D.

Moreover, request 302 may indicate that user 3 corresponds to an admin cluster role for clusters A and B and a basic cluster role for cluster C. Controller 212 may generate the following cluster role binding object for user 3:
    apiVersion: auth.kio.kasten.io/v1alpha1
        kind: K10ClusterRoleBinding
    metadata:
        name: mc_admin_binding_user3
    spec:
        k10ClusterRole:
        name: admin_role
    clusters:
        Cluster A
        Cluster B
    subjects:
        User 3
    apiVersion: auth.kio.kasten.io/v1alpha1
        kind: K10ClusterRoleBinding
    metadata:
        name: mc_basic_binding_user3
    spec:
        k10ClusterRole:
        name: basic role
    clusters:
        Cluster C
    subjects:
        User 3

The above cluster role binding object may indicate that User 3 is bound to the administrator cluster role for clusters A and B and the basic cluster role for cluster C. This may also indicate that User 3 is forbidden from cluster D.

Additionally, request 302 may indicate that user 4 corresponds to a basic cluster role for cluster D. Controller 212 may generate the following cluster role binding object for user 4:
    apiVersion: auth.kio.kasten.io/v1alpha1
        kind: K10ClusterRoleBinding
    metadata:
        name: mc_basic_binding_user4
    spec:

```
k10ClusterRole:
  name: basic_role
clusters:
  Cluster D
subjects:
  User 4
```
The above cluster role binding object may indicate that User 4 is bound to the basic cluster role for cluster D. This may also indicate that User 4 is forbidden from clusters A-C.

Additionally, request 302 may indicate that user 5 corresponds to an admin configuration role for all of secondary computing clusters 120 (e.g., clusters A-D). Controller 212 may generate the following cluster role binding object for user 5:

```
apiVersion: auth.kio.kasten.io/v1alpha1
kind: K10ClusterRoleBinding
metadata:
  name: mc_config_binding_user5
spec:
k10ClusterRole:
  name: admin_role
clusters:
  selector: all
subjects:—User 5
```

The above cluster role binding object may indicate that User 5 is bound to the admin configuration role for clusters A-D.

In some embodiments, primary computing cluster 110 may generate group cluster role binding objects. The group cluster role binding objects may be for zero or more users corresponding to the admin cluster role for a respective secondary computing cluster 120. Each group cluster role binding object may include the group identifier, secondary computing cluster 120's API Group, cluster role, and secondary computing cluster 120's namespace. Each group cluster role binding object may include multiple subjects. Each subject may reference a user or a group. In this way, a group cluster role binding object may reference a user and/or a group.

Primary computing cluster 110 may store the cluster role binding objects in a data storage device within primary computing cluster 110. Furthermore, primary computing cluster 110 may store the mapping of the users and their respective cluster roles for each secondary computing cluster 120 in the data storage device. For example, the cluster role binding objects and the mapping may be stored in controller 212, as shown in FIG. 2. The cluster role binding objects and mapping may create a rule that the users have access to the respective secondary computing cluster 120 based on the respective cluster role.

Figure 4:
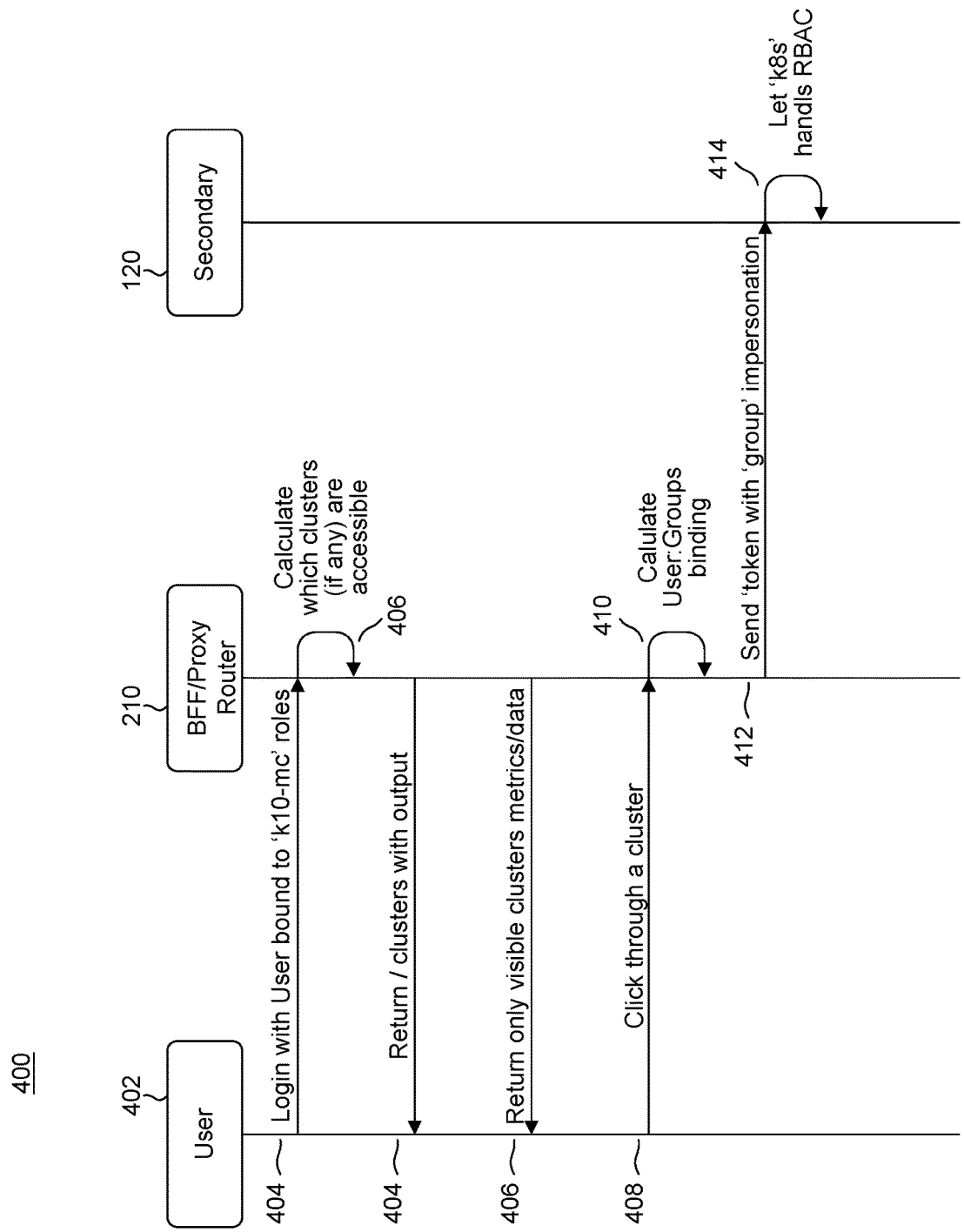
FIG. 4 illustrates a process of accessing a secondary computing cluster, according to some embodiments.

FIG. 4 illustrates process 400 of accessing a secondary computing cluster, according to some embodiments. Process 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps of process 400 may be performed simultaneously, or in a different order than shown in FIG. 4, as will be understood by a person of ordinary skill in the art. FIG. 4 shall be described with reference to FIGS. 1-2. However, FIG. 4 is not limited to that example embodiment.

In 404, primary computing cluster 110 receives a request from client device 100 login to primary computing cluster 110 using client device 100. The request may include user 402's user credentials. Primary computing cluster 110 may authenticate user 402 as described with respect to FIG. 2.

In 405, after authenticating user 402, BFF/Proxy Router 210 determines user 402's cluster role bindings for secondary computing clusters 120. BFF/Proxy Router 210 may reside in primary computing cluster 110, as shown in FIG. 2. In some embodiments, BFF/Proxy Router 210 may retrieve the mapping and cluster role binding objects corresponding to user 402 from controller 212, as shown in FIG. 2, using user 402's user credentials. BFF/Proxy Router 210 may determine user 402's cluster role bindings (if any) based on the mappings and cluster role binding objects.

In 406, BFF/Proxy Router 210 renders user interface 104 on client device 100. User interface 104 may include information associated with one or more secondary computing clusters 120, which user 402 is authorized to access based on user 402's cluster role binding corresponding to each of one or more secondary computing clusters 120. User interface 104 may allow user 402 to transmit requests to the one or more secondary computing clusters 120 in accordance with user 402's cluster role binding corresponding to the one or more secondary computing clusters 120.

In some embodiments, a user 402 may have multiple cluster role bindings for at least one of the one or more secondary computing clusters 120. In this scenario, BFF/Proxy Router 210 may determine that the user's permissions for the at least one secondary computing cluster 120 are a union of the permissions associated with the multiple cluster role bindings.

In 408, BFF/Proxy Router 210 renders metrics and data related to the one or more secondary computing clusters 120 on user interface 104. The metrics and data may be rendered on user interface 104 in accordance with user's 402 cluster role binding corresponding to the one or more secondary computing clusters 120.

In 410, BFF/Proxy Router 210 receives a request to view or modify an element of a secondary computing cluster 120 from user interface 104. For example, user 402 may click through namespaces or applications of secondary computing cluster 120 to transmit a request associated with one or more of the namespaces or applications of secondary computing cluster 120.

In 412, BFF/Proxy Router 210 determines user 402's cluster role binding for secondary computing cluster 120 based on the mappings and cluster role binding objects. User 402 may have multiple cluster role bindings for secondary computing cluster 120. In this scenario, BFF/Proxy Router 210 may identify at least one cluster role for the user from the multiple cluster role bindings based on the content of the request. Alternatively, BFF/Proxy Router 210 may identify at least one cluster role for the user from the multiple cluster role bindings based on a union of the multiple cluster role bindings.

In 414, BFF/Proxy Router 210 forwards the request to secondary computing cluster 120 by impersonating user 402's cluster role binding for secondary computing cluster 120. BFF/Proxy Router 210 may act as user 402 using impersonation headers. Specifically, in forwarding the request, BFF/Proxy Router 210 may make an API call to secondary computing cluster 120, including credentials corresponding to primary computing cluster 110 (as generated during the boot-strapping process) and impersonation headers. The credentials corresponding to primary computing cluster 110 may include an MCSA token. The impersonation headers may include a token corresponding to user 402's cluster role for secondary computing cluster 120. An API (e.g., gateway 216 as shown in FIG. 2) on secondary computing cluster 120 may authenticate primary computing cluster 110's credentials (e.g., MCSA token). The API ensures that primary computing cluster 110 has the authorization to impersonate users. The API replaces primary computing cluster 110's credentials with impersonation values (e.g., the token corresponding to user 402's cluster role for secondary computing cluster 120) in the request. In this regard, BFF/Proxy Router 210 transmits the request using a persistent connection between primary computing cluster 110 and secondary computing cluster 120. The persistent connection is established using primary computing cluster 110's credentials (e.g., MCSA token).

The API determines the user 402's permissions based on user 402's cluster role binding. The permission settings for the different cluster roles may be predefined for secondary computing cluster 120. As a non-limiting example, the API may use Role-based access control (RBAC) to determine user 402's permission settings. Secondary computing cluster 120 processes the request in accordance with the identified permissions for user 402.

Figure 5:
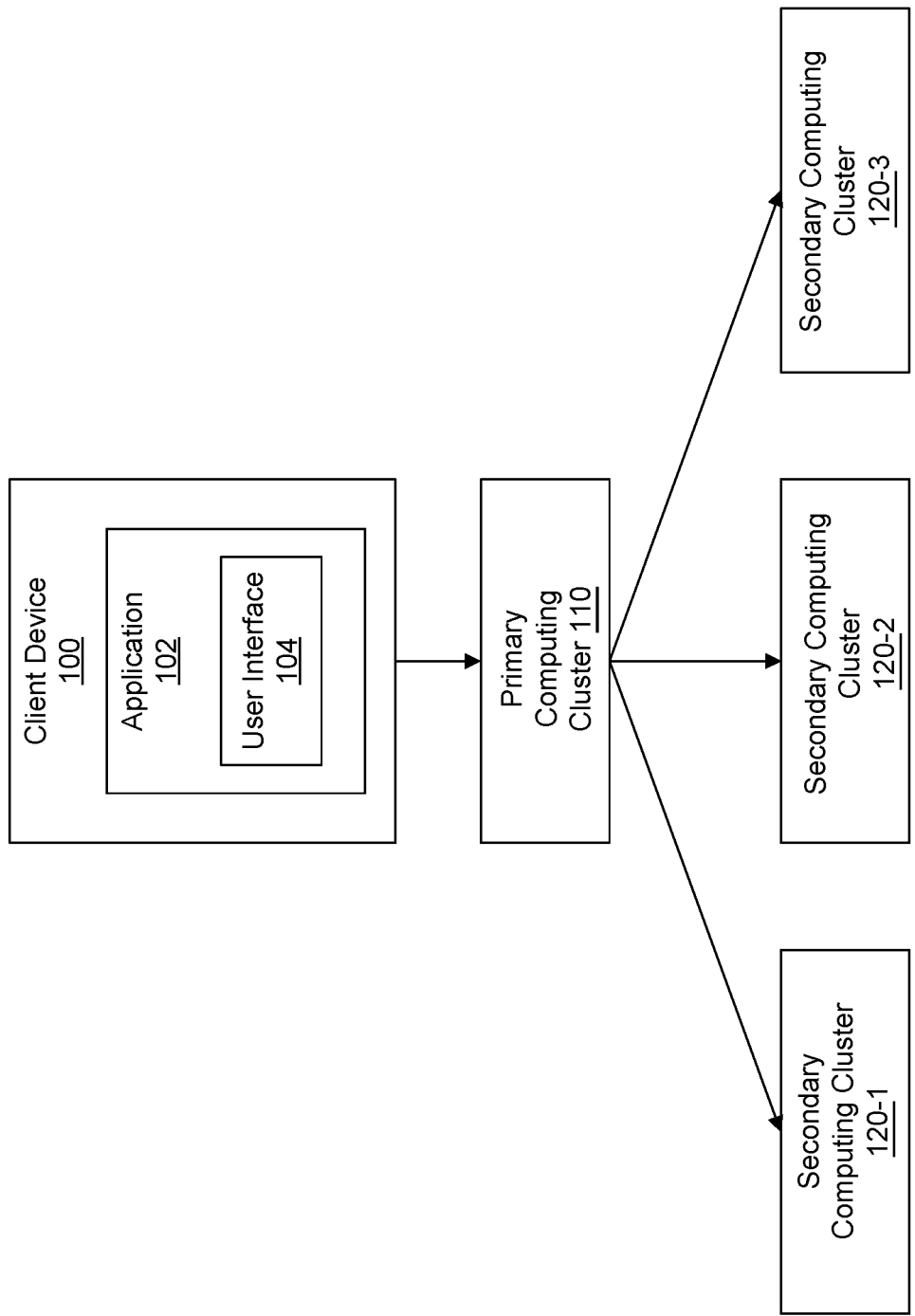
FIG. 5 is a block diagram illustrating example components of the system for multi-cluster management.

FIG. 5 is a block diagram illustrating example components of the system for multi-cluster management. FIG. 5 is described with reference to FIGS. 1-4. However, FIG. 5 is not limited to that example embodiment.

In some embodiments, the components may include client device 100, primary computing cluster 110, and secondary computing clusters 120-1-120-3. Primary computing cluster 110 may be boot-strapped to secondary computing clusters 120-1-120-3 using the process described with respect to FIG. 2.

As a non-limiting example, secondary computing clusters 120-1 and 120-2 may correspond with development and testing applications, and secondary computing cluster 120-3 may correspond with production. In this regard, an admin user may transmit a request to access primary computing cluster 110 to primary computing cluster 110 using client device 106. The request may include the admin user's user credentials. Primary computing cluster 110 may authenticate the admin user and may render user interface 104 on client device 100.

The admin user may transmit a request to create cluster role bindings for user 1, user 2, and user 3 with respect to secondary computing clusters 120-1-120-3 using user interface 104. The request may include user identifiers and a cluster role corresponding to one or more secondary computing clusters 120-1-120-3. For example, the request may indicate that user 1 is to be an admin user for secondary computing clusters 120-1-120-3, user 2 is to be a basic user for secondary computing clusters 120-1 and 120-2, and user 3 is to be an admin user for secondary computing cluster 120-1 and 120-2 and a basic user for secondary computing cluster 120-3. As such, user 2 may not be allowed to access secondary computing cluster 120-3. Furthermore, the request may include namespaces or applications which user 2 is allowed to access.

Primary computing cluster 110 may receive the request and may bind users 1, 2, and 3 to the cluster roles defined in the request. For example, primary computing cluster 110 may generate cluster role binding objects for users 1, 2, and 3. Primary computing cluster 110 may generate a cluster role binding object for user 1, indicating that user 1 corresponds with the admin cluster role for secondary computing clusters 120-1-120-3. Primary computing cluster 110 may generate a cluster role binding object for user 2, indicating that user 2 corresponds with the basic cluster role for secondary computing clusters 120-1 and 120-2. Primary computing cluster 110 may generate a cluster role binding object for user 3, indicating that user 3 corresponds with the admin cluster role for secondary computing cluster 120-1 and 120-2 and the basic cluster role for secondary computing cluster 120-3. Primary computing cluster 110 may generate a mapping of which secondary computing cluster each of users 1, 2, and 3 can access. Primary computing cluster 110 may store the cluster role binding object and the mapping in a data storage device (e.g., controller 212, as shown in FIG. 2).

User 3 may transmit a request to access primary computing cluster 110 using client device 106. The request may include user 3's user credentials. Primary computing cluster 110 may authenticate user 3, as described with respect to FIG. 2. Once authenticated, primary computing cluster 110 may retrieve the mapping and the cluster role binding objects corresponding to user 3.

Primary computing cluster 110 may determine that user 3 corresponds with the admin cluster role for secondary computing cluster 120-1 and 120-2 and the basic cluster role for secondary computing cluster 120-3. Primary computing cluster 110 may generate user interface 104 and may cause a display of user interface 104 on client device 100. User interface 104 may have information related to secondary computing clusters 120-1-120-3 in accordance with user 3's respective cluster role. For example, user interface 104 may allow user 3 to transmit requests permitted to administrators for secondary computing clusters 120-1 and 120-2 and limit the requests that can be transmitted to secondary computing cluster 120-3 based on user 3's permission settings. User interface 104 may also allow user 3 to view all the namespaces and applications for secondary computing clusters 120-1 and 120-2. However, user interface 103 may limit the visibility of the namespaces and applications of secondary computing cluster 120-3 to the ones that user 3 may access.

User 3 may transmit a request that is intended for a namespace in secondary computing cluster 120-3 using user interface 104. Primary computing cluster 110 may receive the request. Primary computing cluster 110 may determine user 3's cluster role with respect to secondary computing cluster 120-3. Primary computing cluster 110 may forward the request to secondary computing cluster 120-3 while impersonating user 3's cluster role for secondary computing cluster 120-3. Primary computing cluster 110 may impersonate user 3 as described above with respect to FIG. 4.

Secondary computing cluster 120-3 may authenticate the request as described with respect to FIG. 4. Secondary computing cluster 120-3 may process the request as if it were received from a user corresponding to the basic cluster role.

Figure 6:
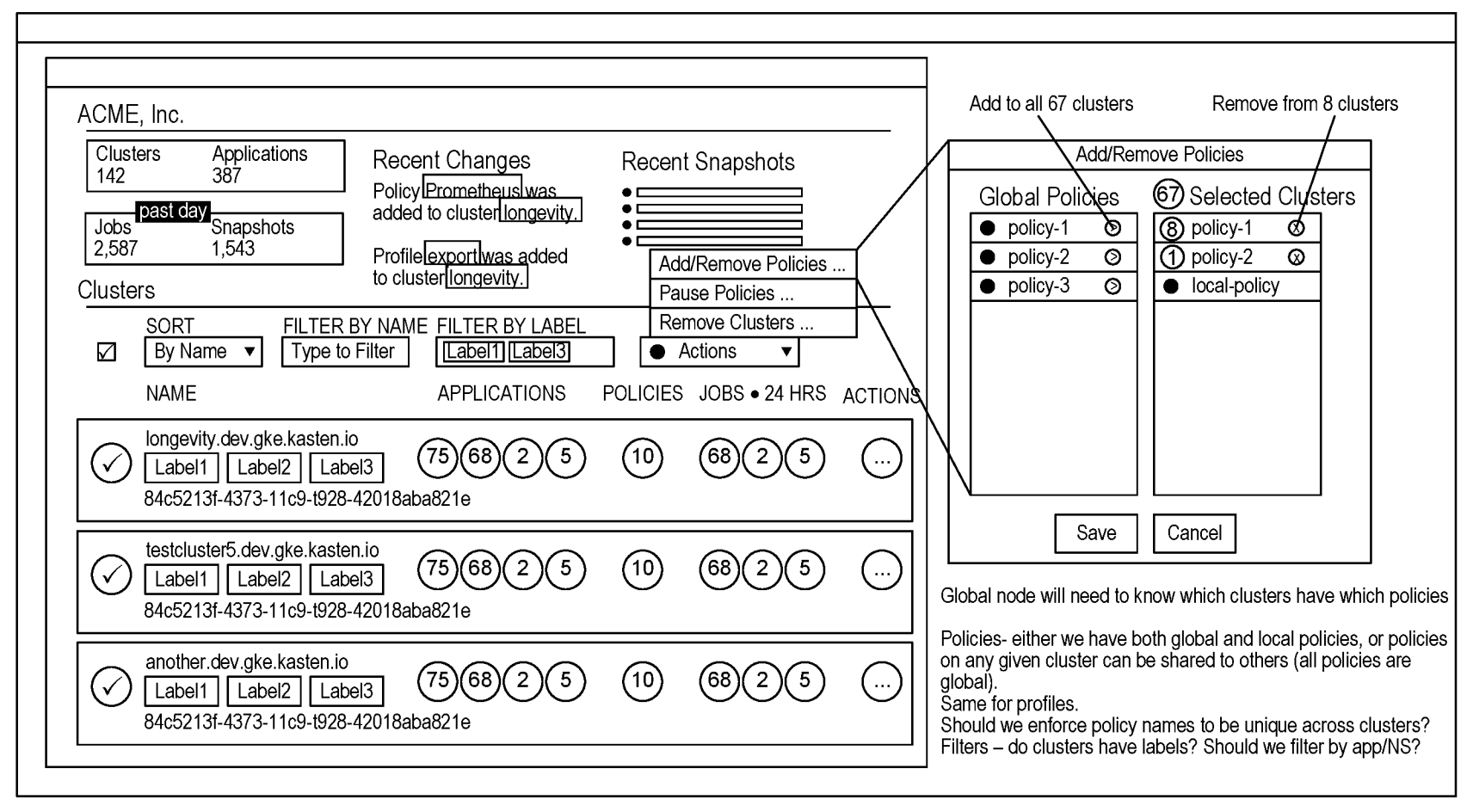

FIG. 6 illustrates an example user interface 104 for the system of multi-cluster management, according to some embodiments. FIG. 6 is described with reference to FIGS. 1-2. However, FIG. 6 is not limited to that example embodiment.

User interface 104 may be rendered on client device 100 in response to authenticating the user and determining the user's cluster role binding for each respective secondary computing cluster 120. User interface 104 may be displayed on application 102, an internet browser, or other platform.

User interface 104 includes elements 600-618. Element 600 may include metrics about secondary computing clusters 120 and the applications executing on secondary computing clusters 120. As described above, the instrumentation framework 214, as shown in FIG. 2, of primary computing cluster 110 may interface with instrumentation framework 218 of a respective secondary computing cluster 120 to gather the metrics associated with the respective secondary computing cluster 120. Element 602 may include the jobs executed by the applications and secondary computing clusters 120 and snapshots in the past day (or any other time period).

Element 604 may include recent changes in any secondary computing clusters 120. Element 606 may include recent snapshots captured of any secondary computing cluster 120.

Element 608 may be a dropdown to add/remove policies, pause policies, or remove clusters. Selecting element 608 may cause element 610 to be displayed. Element 610 may allow the users to add/remove policies for selected clusters of secondary computing clusters 120.

Element 612 may include one or more input fields for filtering a list of clusters. The input fields may include sorting and filtering options. In response to selecting one or more of the sorting and filtering options, a list of secondary computing clusters 120 may be displayed on user interface 104.

The list of clusters may include elements 614-618. Elements 614-618 may include information about the respective secondary computing cluster 120. The information may include namespace address, identifier, labels, applications, policies, jobs executed in the past 24 hours (or any other time period), and an input selection for executing actions related to the respective secondary computing cluster 120.

Figure 7:
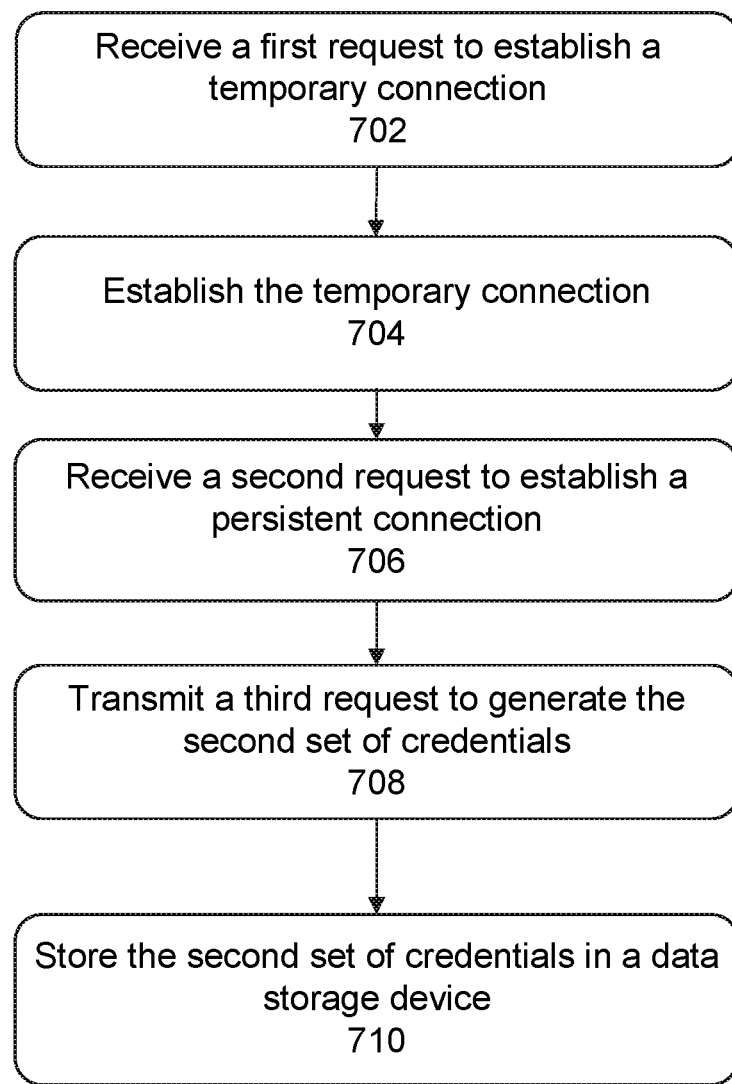
FIG. 7 is a flowchart illustrating a process for establishing a persistent connection between the primary computing cluster and secondary computing cluster, according to some embodiments.

FIG. 7 is a flowchart illustrating a process for establishing a persistent connection between the primary computing cluster and secondary computing cluster, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 7, as will be understood by a person of ordinary skill in the art.

Method 700 shall be described with reference to FIG. 1. However, method 700 is not limited to that example embodiment.

In 702, server 114 receives a first request to establish a temporary connection between primary computing cluster 110 and secondary computing cluster 120 from client device 100. Server 114 may be part of computing resources 112 of primary computing cluster 110. The request may include a first set of credentials corresponding to an admin user. The admin user may have permission to access primary computing cluster 110 and secondary computing cluster 120.

In 704, server 114 establishes the temporary connection between primary computing cluster 110 and secondary computing cluster 120 using the first set of credentials. Server 114 may access secondary computing cluster 120 using the first set of credentials to form the temporary connection. Server 114 may render user interface 104 on client device 100 to provide the temporary credentials and initiate the temporary connection to secondary computing cluster 120. Moreover, user interface 104 may render a status or progress while the temporary connection is established and the configuration process is executed. User interface 104 may provide the admin user to transmit requests to secondary computing cluster 120.

In 706, server 114 receives a second request to establish a persistent connection between primary computing cluster 110 and secondary computing cluster 120 from user interface 104. Establishing the persistent connection may involve generating a second set of credentials for primary computing cluster 110 to access secondary computing cluster 120. In this regard, the second request may include configuration settings for generating the second set of credentials. The request may also include an identifier of secondary computing cluster 120.

In 708, server 114 transmits a third request to generate the second set of credentials to secondary computing cluster 120 using the temporary connection. The request may include the configuration settings, security certificates, and IP addresses of computing resources 122. A computing resource of secondary computing cluster 120 may package the configuration settings, security certificates, and IP addresses to generate the second set of credentials. Secondary computing cluster 120 may transmit the second set of credentials to primary computing cluster 110.

In 710, server 114 stores the second set of credentials in a data storage device. For example, the data storage device may be coupled with controller 212 residing on primary computing cluster 110. The second set of credentials may allow non-admin users to access secondary computing cluster 120 without specific credentials corresponding to secondary computing cluster 120.

Figure 8:
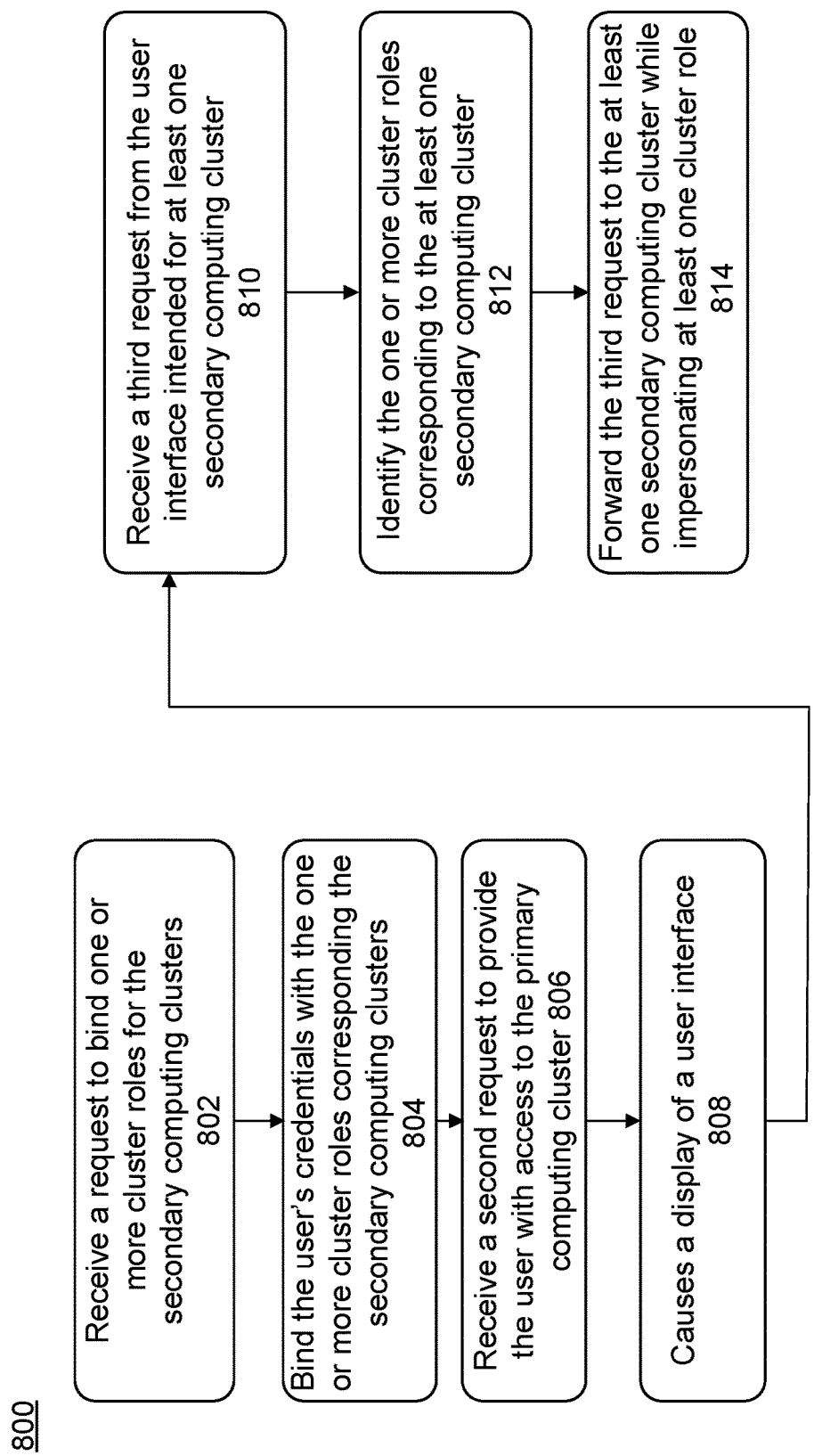
FIG. 8 is a flowchart illustrating a process for accessing a secondary computing cluster, according to some embodiments.

FIG. 8 is a flowchart illustrating a process for accessing a secondary computing cluster, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 8, as will be understood by a person of ordinary skill in the art.

Method 800 shall be described with reference to FIG. 1. However, method 800 is not limited to that example embodiment.

In 802, server 114 receives a request to bind one or more cluster roles associated with a user for each of one or more secondary computing clusters 120. The first request includes the user's credentials. The first request may be transmitted by an admin user using client device 100. The first request may also include the one or more cluster roles for each of the one or more secondary computing clusters 120. The one or more cluster roles may be admin, basic, temporary configuration, and backup admin.

In 804, server 114 binds the user's credentials with the one or more cluster role corresponding to each of the one or more secondary computing clusters 120. Server 114 may generate a mapping of which secondary computing clusters 120 the user can access. Furthermore, server 114 may generate cluster role bindings for the user that indicate the respective cluster role for each respective secondary computing cluster 120.

In 806, server 114 may receive a second request to provide the user with access to primary computing cluster 110. The user may transmit the second request from client device 106. The second request includes the user's credentials. Server 114 may authenticate the user using the user's credentials. Server 114 may also determine the one or more cluster roles associated with the user for each respective secondary computing cluster 120 based on the mapping and cluster role bindings.

In 808, server 114 causes a display of user interface 104 on client device 100 in response to authenticating the user's credentials. User interface 104 may include information about the one or more secondary computing clusters which the user can access. The information may be included on user interface 104 in accordance with the one or more cluster roles for each respective secondary computing cluster 120.

In 810, server 114 receives a third request from user interface 104 intended for at least one secondary computing cluster 120 of the one or more secondary computing clusters 120 which the user can access.

In 812, server 114 identifies the one or more cluster roles associated with the user corresponding to the at least one secondary computing cluster 120 based on the user's credentials. Server 114 may determine the one or more cluster roles associated with the user for the at least one secondary computing cluster 120 based on the mapping and cluster role bindings.

In 814, server 114 forwards the third request to the at least one secondary computing cluster 120 while impersonating at least one cluster role of the one or more cluster roles corresponding to the at least one secondary computing cluster 120. For example, in the event the user has more than one cluster role bindings for the at least one secondary computing cluster 120, server 114 may identify the at least one cluster role based on the content of the third request. Alternatively, the at least one cluster role may be a union of the multiple cluster role bindings associated with the user for the at least one secondary computing cluster 120.

Server 114 may impersonate the cluster role by including a token corresponding to at least one cluster role and primary computing cluster 110's credentials in the request. Primary computing cluster 110's credentials may be generated during the boot-strapping process, as described with respect to FIG. 2 and method 700 of FIG. 7. At least one secondary computing cluster 120 may authenticate primary computing cluster 110's credentials. At least one secondary computing cluster 120 may identify the at least one cluster role based on the token. At least one secondary computing cluster 120 may identify the user's permission settings based on the at least one cluster role and process the request based on the user's permission settings.

Figure 9:
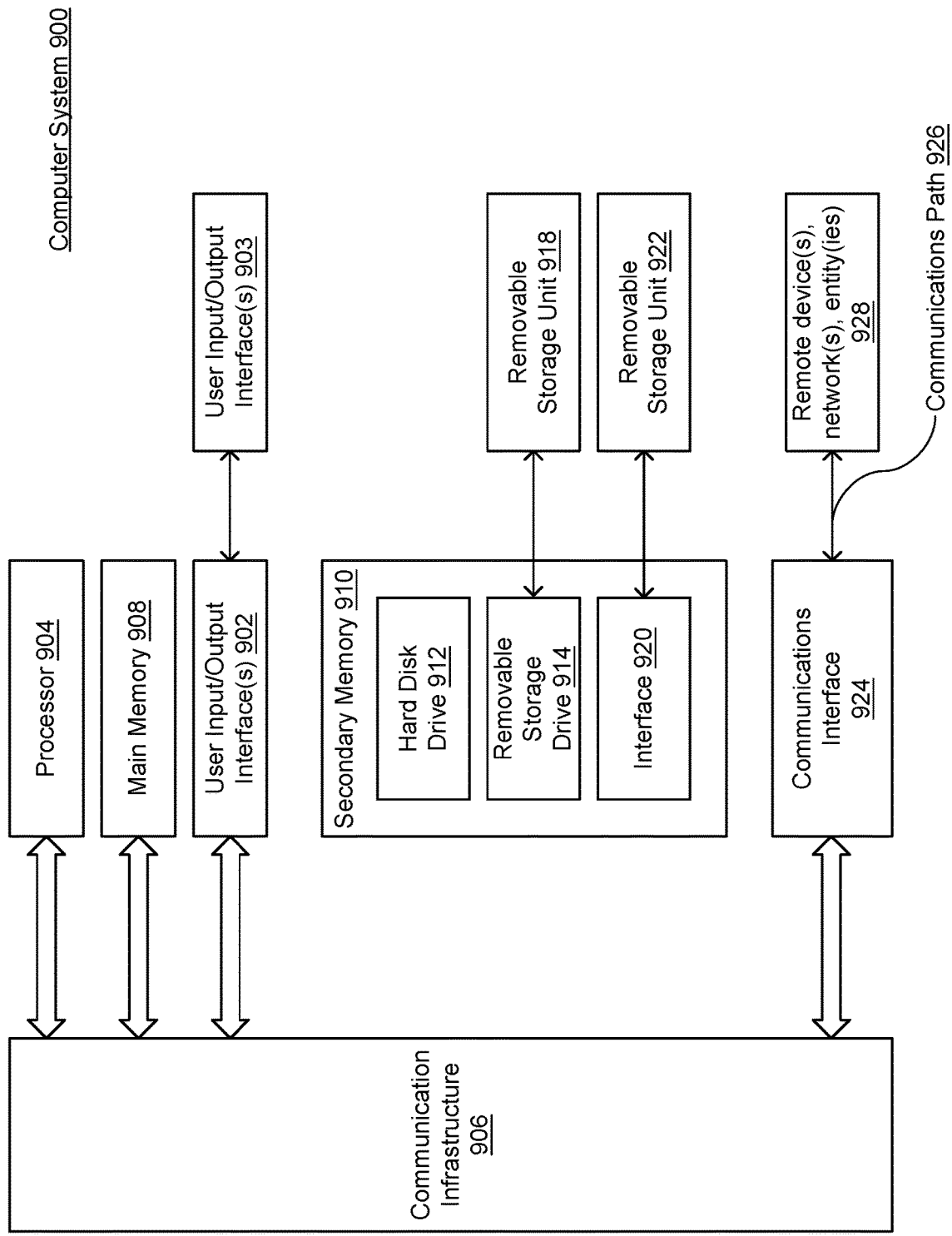
FIG. 9 is an example computer system useful for implementing various embodiments.

Various embodiments can be implemented, for example, using one or more computer systems, such as computer system 900 shown in FIG. 9. Computer system 900 can be used, for example, to implement methods 700 of FIG. 7 and 800 of FIG. 8. Furthermore, computer system 900 can be at least part of client device 100, primary computing cluster 110, and secondary computing cluster 120, as shown in FIG. 1. For example, computer system 900 routes communication to various applications. Computer system 900 can be any computer capable of performing the functions described herein.

Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904, can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 can include one or more levels of cache. Main memory 908 has stored therein control logic (i.e., computer software) and/or data.

Computer system 900 can also include one or more secondary storage devices or memory 910. Secondary memory 910 can include, for example, a hard disk drive 912 and/or a removable storage device or drive 914. Removable storage drive 914 can be a floppy disk drive, a magnetic tape drive, a compact disk drive, an optical storage device, tape backup device, and/or any other storage device/drive.

Removable storage drive 914 can interact with a removable storage unit 918. Removable storage unit 918 includes a computer usable or readable storage device having stored thereon computer software (control logic) and/or data. Removable storage unit 918 can be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 can include other means, instrumentalities, or other approaches for allowing computer programs and/or other instructions and/or data to be accessed by computer system 900. Such means, instrumentalities, or other approaches can include, for example, a removable storage unit 922 and an interface 920. Examples of the removable storage unit 922 and the interface 920 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 can further include a communication or network interface 924. Communication interface 924 enables computer system 900 to communicate and interact with any combination of remote devices, remote networks, remote entities, etc. (individually and collectively referenced by reference number 928). For example, communication interface 924 can allow computer system 900 to communicate with remote devices 928 over communications path 926, which can be wired and/or wireless, and which can include any combination of LANs, WANs, the Internet, etc. Control logic and/or data can be transmitted to and from computer system 900 via communication path 926.

In some embodiments, a tangible, non-transitory apparatus, or article of manufacture comprising a tangible, non-transitory computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc., using orderings different than those described herein.

References herein to "one embodiment," "an embodiment," "an example embodiment," or similar phrases indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for defining cluster role bindings for accessing computing clusters in a multi-cluster environment, the computer-implemented method comprising:
    receiving at a primary computing cluster a first request to bind one or more cluster roles associated with a user to each of one or more secondary computing clusters, wherein the first request comprises the user's credentials;
    binding the user's credentials with the one or more cluster roles corresponding to each of one or more secondary computing clusters;
    receiving a second request for providing the user access to the primary computing cluster, wherein the second request comprises the user's credentials;
    causing display of a user interface in response to an authentication of the user's credentials for the primary computing cluster;
    receiving a third request from the user interface intended for at least one secondary computing cluster of the one or more secondary computing clusters;
    identifying the one or more cluster roles corresponding to the at least one secondary computing cluster based on the user's credentials;
    generating a computing cluster token that indicates user permissions for the at least one secondary computing cluster based on a union of user permissions according to a cluster role of the primary computing cluster and user permissions according to a cluster role of the one or more cluster roles corresponding to the at least one secondary computing cluster; and
    forwarding the third request to the at least one secondary computing cluster, wherein the third request includes the computing cluster token to facilitate an impersonation of at least one cluster role of the one or more cluster roles corresponding to the at least one secondary computing cluster.

2. The computer-implemented method of claim 1, further comprising:
    establishing a connection between the primary computing cluster and the one or more secondary computing clusters using the user's credentials or a different set of credentials corresponding to the primary computing cluster, wherein the third request is transmitted to the at least one secondary computing cluster using the connection.

3. The computer-implemented method of claim 1, further comprising:
    determining the one or more cluster roles corresponding to the one or more secondary computing clusters and the user in response to the user accessing the primary computing cluster using the user's credentials;
    identifying information associated with each of the one or more secondary computing clusters that is accessible to the user based on the one or more cluster roles corresponding to the one or more secondary computing clusters and the user; and
    causing display of the information associated with the one or more secondary computing clusters on the user interface.

4. The computer-implemented method of claim 1, wherein a union of the one or more cluster roles corresponding to each of the one or more secondary computing clusters defines additional permission settings with each respective secondary computing cluster.

5. The computer-implemented method of claim 4, wherein the third request is forwarded to the at least one secondary computing cluster based on the user's permission settings with the at least one secondary computing cluster.

6. The computer-implemented method of claim 1, wherein the one or more cluster roles corresponding to the one or more secondary computing clusters comprises at least one of an administrator configuration, a basic configuration, or a temporary configuration.

7. The computer-implemented method of claim 1, wherein the one or more cluster roles corresponding to a first secondary computing cluster of the one or more secondary computing clusters are different from the one or more cluster roles corresponding to a second secondary computing cluster of the one or more secondary computing clusters.

8. The computer-implemented method of claim 1, wherein the binding of the user's credentials with the one or more cluster roles corresponding to each of the one or more secondary computing clusters further comprises:
generating a cluster role binding object indicating the one or more cluster roles corresponding to each of the one or more secondary computing clusters and the user.

9. A system for defining cluster role bindings for accessing computing clusters in a multi-cluster environment, the system comprising:
a memory; and
at least one processor coupled to the memory, the at least one processor configured to:
receive at a primary computing cluster a first request to bind one or more cluster roles associated with a user to each of one or more secondary computing clusters, wherein the first request comprises the user's credentials;
bind the user's credentials with the one or more cluster roles corresponding to each of one or more secondary computing clusters;
receive a second request for providing the user access to the primary computing cluster, wherein the second request comprises the user's credentials;
cause display of a user interface in response to an authentication of the user's credentials for the primary computing cluster;
receive a third request from the user interface intended for at least one secondary computing cluster of the one or more secondary computing clusters;
identify the one or more cluster roles corresponding to the at least one secondary computing cluster based on the user's credentials;
generate a computing cluster token that indicates user permissions for the at least one secondary computing cluster based on a union of user permissions according to a cluster role of the primary computing cluster and user permissions according to a cluster role of the one or more cluster roles corresponding to the at least one secondary computing cluster; and
forward the third request to the at least one secondary computing cluster, wherein the third request includes the computing cluster token to facilitate an impersonation of at least one cluster role of the one or more cluster roles corresponding to the at least one secondary computing cluster.

10. The system of claim 9, wherein the at least one processor is configured to:
establish a connection between the primary computing cluster and the one or more secondary computing clusters using the user's credentials or a different set of credentials corresponding to the primary computing cluster, wherein the third request is transmitted to the at least one secondary computing cluster using the connection.

11. The system of claim 9, wherein the at least one processor is configured to:
determine the one or more cluster roles corresponding to the one or more secondary computing clusters and the user in response to the user accessing the primary computing cluster using the user's credentials;
identify information associated with each of the one or more secondary computing clusters that is accessible to the user based on the one or more cluster roles corresponding to the one or more secondary computing clusters and the user; and
cause display of the information associated with the one or more secondary computing clusters on the user interface.

12. The system of claim 9, wherein a union of the one or more cluster roles corresponding to each of the one or more secondary computing clusters defines additional permission settings with each respective secondary computing cluster.

13. The system of claim 12, wherein the third request is forwarded to the at least one secondary computing cluster based on the user's permission settings with the at least one secondary computing cluster.

14. The system of claim 9, wherein the one or more cluster roles corresponding to the one or more secondary computing clusters comprises at least one of an administrator configuration, a configuration, or a temporary configuration.

15. The system of claim 9, wherein the one or more cluster roles corresponding to a first secondary computing cluster of the one or more secondary computing clusters are different from the one or more cluster roles corresponding to a second secondary computing cluster of the one or more secondary computing clusters.

16. The system of claim 9, wherein when binding the user's credentials with the one or more cluster roles corresponding to each of the one or more secondary computing clusters the at least one processor is further configured to:
generate a cluster role binding object indicating the one or more cluster roles corresponding to each of the one or more secondary computing clusters and the user.

17. A non-transitory computer-readable medium having instructions stored thereon that, when executed by at least one computing device, cause the at least one computing device to perform operations comprising:
receiving at a primary computing cluster a first request to bind one or more cluster roles associated with a user to each of one or more secondary computing clusters, wherein the first request comprises the user's credentials;
binding the user's credentials with the one or more cluster roles corresponding to each of one or more secondary computing clusters;
receiving a second request for providing the user access to the primary computing cluster, wherein the second request comprises the user's credentials;
causing display of a user interface in response to an authentication of the user's credentials for the primary computing cluster;
receiving a third request from the user interface intended for at least one secondary computing cluster of the one or more secondary computing clusters;
identifying the one or more cluster roles corresponding to the at least one secondary computing cluster based on the user's credentials;
generating a computing cluster token that indicates user permissions for the at least one secondary computing cluster based on a union of user permissions according to a cluster role of the primary computing cluster and user permissions according to a cluster role of the one or more cluster roles corresponding to the at least one secondary computing cluster; and
forwarding the third request to the at least one secondary computing cluster, wherein the third request includes the computing cluster token to facilitate an impersonation of at least one cluster role of the one or more cluster roles corresponding to the at least one secondary computing cluster.

18. The non-transitory computer readable medium of claim 17, wherein the operations further comprise:
establishing a connection between the primary computing cluster and the one or more secondary computing clusters using the user's credentials or a different set of credentials corresponding to the primary computing cluster, wherein the third request is transmitted to the at least one secondary computing cluster using the connection.

19. The non-transitory computer readable medium of claim 17, wherein the operations further comprise:
determining the one or more cluster roles corresponding to the one or more secondary computing clusters and the user in response to the user accessing the primary computing cluster using the user's credentials;
identifying information associated with each of the one or more secondary computing clusters that is accessible to the user based on the one or more cluster roles corresponding to the one or more secondary computing clusters and the user; and
causing display of the information associated with the one or more secondary computing clusters on the user interface.

20. The non-transitory computer readable medium of claim 17, wherein a union of the one or more cluster roles corresponding to each of the one or more secondary computing clusters defines additional permission settings with each respective secondary computing cluster.

* * * * *